United States Patent [19]
Yasuhara et al.

[11] Patent Number: 5,670,992
[45] Date of Patent: Sep. 23, 1997

[54] PORTABLE GRAPHIC COMPUTER APPARATUS

[75] Inventors: Nae Yasuhara; Masaharu Kashii; Miyuki Marusawa; Yoshio Iizuka; Satoru Murayama, all of Tokyo, Japan

[73] Assignee: Sony Corporation, Tokyo, Japan

[21] Appl. No.: 950,975

[22] Filed: Sep. 23, 1992

Related U.S. Application Data

[63] Continuation of Ser. No. 571,719, Aug. 24, 1990, abandoned.

[30] Foreign Application Priority Data

Aug. 25, 1989 [JP] Japan ................... 1-219820

[51] Int. Cl.$^6$ .................................... G09G 5/00
[52] U.S. Cl. ........................................... 345/173
[58] Field of Search ........................ 340/706, 709, 340/703, 712, 711, 707, 825.19, 384 R; 178/18, 19; 434/88, 169, 170, 163, 164, 201, 307, 765, 162, 323, 165; 273/237, 437, DIG. 28; 345/173, 174, 175, 176, 177, 178, 179, 182, 104, DIG. 901, DIG. 902, DIG. 903, DIG. 905

[56] References Cited

U.S. PATENT DOCUMENTS

| | | | |
|---|---|---|---|
| 3,778,910 | 12/1973 | Smalligan | 434/164 |
| 4,604,062 | 8/1986 | Woods | 434/88 |
| 4,764,763 | 8/1988 | Wickstead et al. | 340/709 |
| 4,912,466 | 3/1990 | Call | 340/709 |
| 5,009,603 | 4/1991 | Fong et al. | 434/201 |

FOREIGN PATENT DOCUMENTS

| | | |
|---|---|---|
| 0 088 565 | 9/1983 | European Pat. Off. |
| 2 405 882 | 8/1974 | Germany. |
| 1 463 560 | 2/1977 | United Kingdom. |

OTHER PUBLICATIONS

"Technique for Selection of Sound Features", 2244 Research Disclosure, Feb. 1989, No. 298, p. 120.
Hammacher Schlemmer, "Electro—Sketch Drawing and Painting System", 1991, p. 29.

*Primary Examiner*—Xiao Wu
*Attorney, Agent, or Firm*—Hill, Steadman & Simpson

[57] ABSTRACT

A portable graphic computer apparatus is comprised of a tablet for inputting coordinates data, a detecting circuit for detecting the coordinates data inputted by the tablet, a video image data forming circuit for forming video image data corresponding to input coordinates based on the coordinates data by an output signal from the detecting circuit, a memory for storing the video image data, a video signal generating circuit for generating a video signal from the video image data, a sound source, a speaker connected to the sound source, an output circuit connected to the video signal generating circuit for outputting the video signal, and a cabinet for accommodating therein elements from the tablet to the speaker, wherein musical scale or sound volume of the sound source is varied by an output signal of the coordinates data detecting circuit.

5 Claims, 8 Drawing Sheets

PORTABLE GRAPHIC COMPUTER APPARATUS

This is a continuation of application Ser. No. 571,719, filed Aug. 24, 1990, now abandoned.

BACKGROUND OF THE INVENTION

1. Field of the Invention

The present invention generally relates to image forming apparatus and, more particularly, is directed to a portable graphic computer apparatus suitably used by children to draw a picture.

2. Description of the Prior Art

When drawing a picture, children used to draw a picture on a drawing paper with crayons and colored pencils, in which case a mistake on the picture could not be corrected with ease. Also, the children could not express their idea freely by drawing pictures because the number of drawing papers is restricted.

Therefore, an image forming apparatus has been proposed, in which a tablet having, for example, a coordinates detecting apparatus, a personal computer having a software for processing inputted coordinates and a television monitor for displaying a video signal generated from the personal computer are combined to display a locus drawn on the tablet on a picture screen of the television monitor. In this case, the picture displayed on the monitor can be corrected with great ease, and the user can draw pictures freely over and over.

An electronic picture drawing apparatus is disclosed, for example, in U.S. Pat. No. 4,764,763. In this picture drawing apparatus, coordinates are inputted by moving a cursor on a display panel by turning right and left knobs. Accordingly, the fundamental idea of this apparatus is different from that of the present invention.

However, since the tablet having the coordinates detecting apparatus and the personal computer having the predetermined software are independently provided as described above, the overall arrangement of the apparatus becomes large in size and the interconnection thereof becomes complicated. There is then the disadvantage that children cannot use this apparatus with ease.

Moreover since electronic, relatively expensive image forming apparatus is utilized, it is desirable that more sophisticated functions than the drawing are also provided.

OBJECTS AND SUMMARY OF THE INVENTION

Accordingly, it is a general object of the present invention to provide an improved portable graphic computer apparatus which can eliminate the aforenoted shortcomings and disadvantages encountered with the prior art.

More specifically, it is an object of the present invention to provide a portable graphic computer apparatus in which an overall arrangement is accommodated within a cabinet and is simplified so that this graphic computer can be suitably used by children.

Another object of the present invention is to provide a portable graphic computer apparatus in which a mechanical portion can be simplified in arrangement and other functions can be extended additionally.

A still another object of the present invention is to provide a portable graphic computer apparatus in which a speaker emanates a sound whose musical scale and sound volume are changed in response to the inputted coordinates to a tablet, thus making it possible for the user to listen to a sound as well as to draw a picture.

A further object of the present invention is to provide a portable graphic computer apparatus in which the user can play a melody and the like with stress if a sound volume and a musical scale are varied in response to the change of the input coordinates in one axial direction and to the change of the input coordinates in the other axial direction.

A further object of the present invention is to provide a portable graphic computer apparatus in which an alarm sound is emanated so that the user can be prevented from leaving a power switch in its ON state inadvertently.

Still a further object of the present invention is to provide a portable graphic computer apparatus in which demonstration video data is formed after a predetermined period of time so that this graphic computer apparatus is suitably exhibited at shop front for demonstration.

Still a further object of the present invention is to provide a portable graphic computer apparatus in which a tracing sheet can be provided on a tablet with ease.

As an aspect of the present invention, a portable graphic computer apparatus is comprised of a tablet for inputting coordinates data, a detecting circuit for detecting the coordinates data inputted by the tablet, a video image data forming circuit for forming video image data corresponding to input coordinates based on the coordinates data by an output signal from the detecting circuit, a memory for storing the video image data, a video signal generating circuit for generating a video signal from the video image data, a sound source, a speaker connected to the sound source, an output circuit connected to the video signal generating circuit for outputting the video signal, and a cabinet for accommodating therein elements from the tablet to the speaker, wherein musical scale or sound volume of the sound source is varied by an output signal of the coordinates data detecting circuit.

The above and other objects, features and advantages of the present invention will be apparent in the following detailed description of the preferred embodiments to be read in conjunction with the accompanying drawings, in which like reference numerals are used to identify the same or similar parts in the several views.

DETAILED DESCRIPTION OF THE PREFERRED EMBODIMENTS

Figure 1:
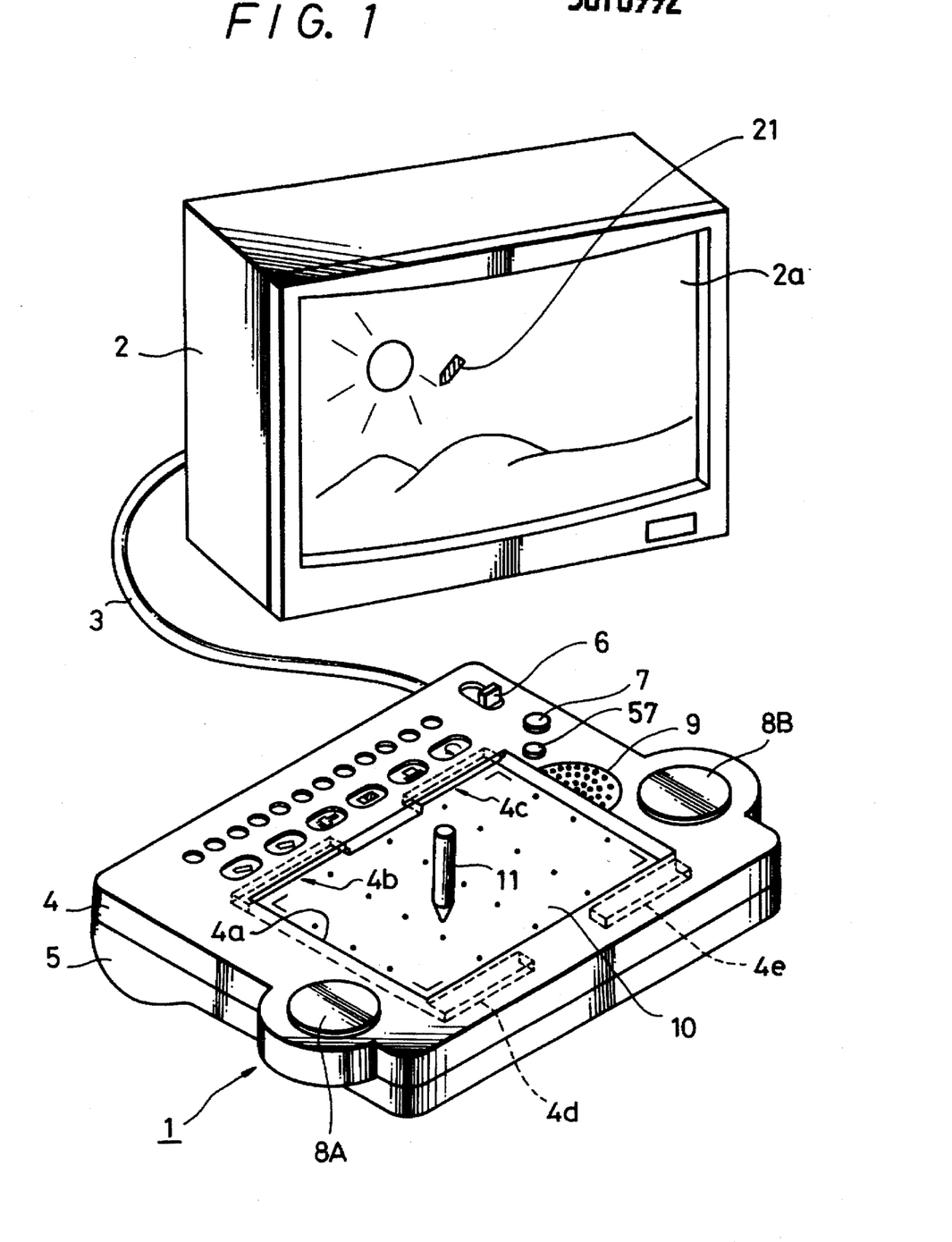
FIG. 1 is a perspective view illustrating a system arrangement of an embodiment of a portable graphic computer apparatus according to the present invention.

The present invention will hereinafter be described with reference to the accompanying drawings. In this embodiment, the present invention is applied to a portable graphic computer apparatus which can be used by the children to draw a picture. FIG. 1 shows the arrangement of an overall system of a first embodiment. In FIG. 1, reference numeral 1 generally represents a graphic computer, and 2 a monitor having video signal input terminal. A video signal output terminal (which will be described later) of the graphic computer 1 and the video signal input terminal of the monitor 2 are coupled via a video cable 3. The cabinet of the graphic computer 1 is formed of an upper casing 4 and a lower casing 5. A power switch 6, a clear button 7, a sound button 57, a sound emanating portion 9 which covers a speaker are provided on the right end portion of the upper casing 4, and executing buttons 8A and 8B are provided on the two side end portions of the upper casing 4. These power switch 6, clear button 7, sound button 57 and executing buttons 8A, 8B are respectively independent mechanical switches.

Further, a rectangular cut-away portion 4a is formed through the center portion of the upper casing 4, and a tablet 10 is provided beneath the cut-away portion 4a as a coordinate input surface of a pressure sensitive type position sensing apparatus. Slots 4b, 4c, 4d and 4e are formed through the recess portion 4a at portions where the cut-away portion 4a contacts with the tablet 10, as shown in FIG. 1. As will be described later, these slots 4b to 4e are used to attach a tracing sheet to the tablet 10.

Reference numeral 11 represents an attachment or accessory pen made of a plastic material, and a fundamental operation thereof will be described. When the user draws a locus by slightly touching the tablet 10 with the attachment pen 11 or with the fingertip while pushing the executing button 8A or 8B, a pen-shaped cursor 21 is displayed on a picture screen 2a of the monitor 2, and the cursor 21 moves in tandem with the locus of the fingertip or the like to display the locus as an image. In this case, the executing buttons 8A, 8B are provided at both sides of the tablet 10 so that even left-handed children can operate this graphic computer with ease. Further, if the clear button 7 is depressed, the video image on the picture screen 2a will be erased completely and the graphic computer 1 stands by, in the picture drawing mode.

When the user depresses the sound button 57 once and the tablet 10 therebeneath is pushed thereby, a predetermined sound is emanated from the sound emanating portion 9. If the user depresses the sound button 57 one more time, the sound emanating portion 9 is inhibited from emanating a sound.

Figure 2:
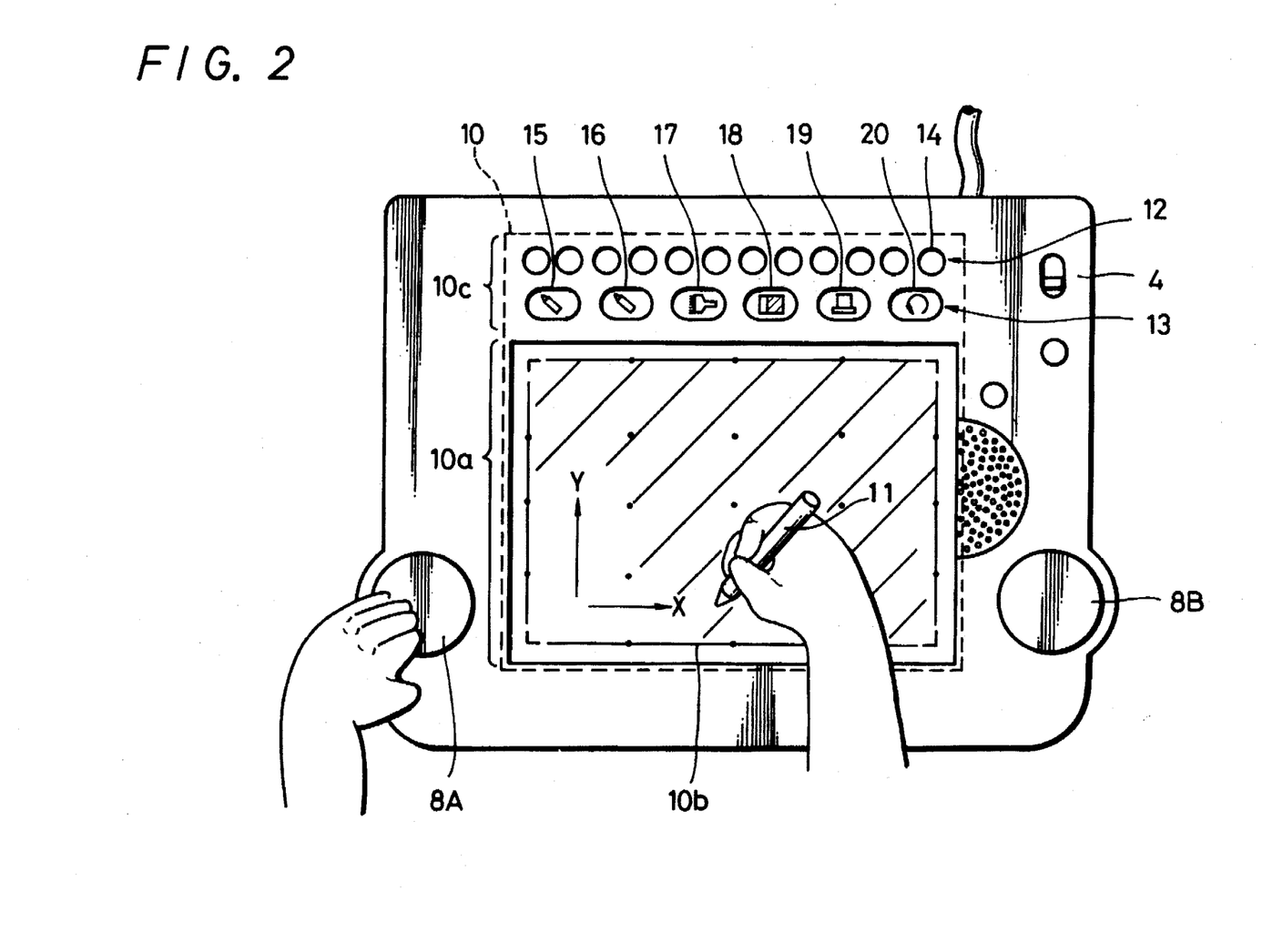
FIG. 2 is a plan view illustrating a portable graphic computer according to the embodiment of the present invention.

The coordinates input surface of the tablet 10 is, as shown in FIG. 2, divided into a picture-drawing area 10a and a menu selecting area 10c, and a portion (hatched area) encircled by a bracket and represented by solid circles at a predetermined pitch in the picture-drawing area 10a is a picture-making area 10b. The aspect ratio of the picture-making area 10b is made coincident with the aspect ratio (3:4) of the picture screen of a standard monitor. A pixel ratio that is a ratio between resolution in the longitudinal direction (Y-direction) and resolution in the lateral direction (X-direction) of the input coordinates of the tablet 10 is made coincident with the ratio of pixels of the standard monitor. Therefore, in this embodiment, there is the advantage that, if the user draws a locus of a circle on the picture-making area 10b precisely, a picture of a circle is also accurately displayed on the picture screen 2a of the monitor 2.

The sound, emanated when the user pushes the picture-making area 10b with the fingertip or the like, increases its sound volume successively along the X-axis of the input coordinates (X, Y). Also, the emanated sound increases its musical scale successively along the Y-axis (about three octaves at maximum).

The menu selecting area 10c of the tablet 10 is further divided to provide a color selecting area 12 and a tool selecting area 13. The upper casing 4 has twelve bores or round openings 14 at the color selecting area 12, and the upper casing 4 also has six openings or slots 15 to 20 at the tool selecting area 13. If the user slightly touches the tablet 10 through the twelve round openings 14 with the attachment pen 11 or the like, twelve kinds of colors (black/blue/green/yellow/red/white, etc.,) will be designated. If the user slightly touches the tablet 10 through the six slots 15 to 20, then five kinds of tools (bold line, very bold line, brush, eraser, stamp) and a cancel function will be designated, respectively. The selected opening in those twelve round openings 14 and six slots 15 to 20 can be discriminated on the basis of the input coordinates to the tablet 10.

As described above, according to this embodiment, color, tool and cancel function are identified on the basis of the input coordinates, and thus the mechanical portion can be simplified. Further there is the advantage that other various functions can be additionally provided only by subdividing or extending the menu selecting area 10c. For convenience of explanation, those twelve round openings 14 will be referred to as color selecting buttons 14 and those six slots 15 to 20 will be referred to a bold line button 15, a very bold line button 16, a brush button 17, an eraser button 18, a stamp button 19 and a cancel button 20, hereinafter respectively. Functions of these buttons 15 to are as follows:

1 bold line button 15 . . . to draw a free curve in bold line of 2×2 dots 2 very bold line button 16 . . . to draw a free curve by 6×6 columnar dots 3 brush button 17 . . . to cause the cursor 21 within the picture screen 2a of the monitor 2 to be shaped as a brush to paint the closed area in a designated color 4 eraser button 18 . . . to cause the cursor 21 within the picture screen 2a of the monitor 2 to be shaped as an eraser to erase a figure drawn 5 stamp button 19 . . . to form a video image of a pattern, each being formed of 16×16 dots, selected from 28 kinds of stamps at a desired position 6 cancel button 20 . . . to return to the picture of just one procedure before. One procedure means a process which is finished during the depression of the executing button 8A.

Figure 3:
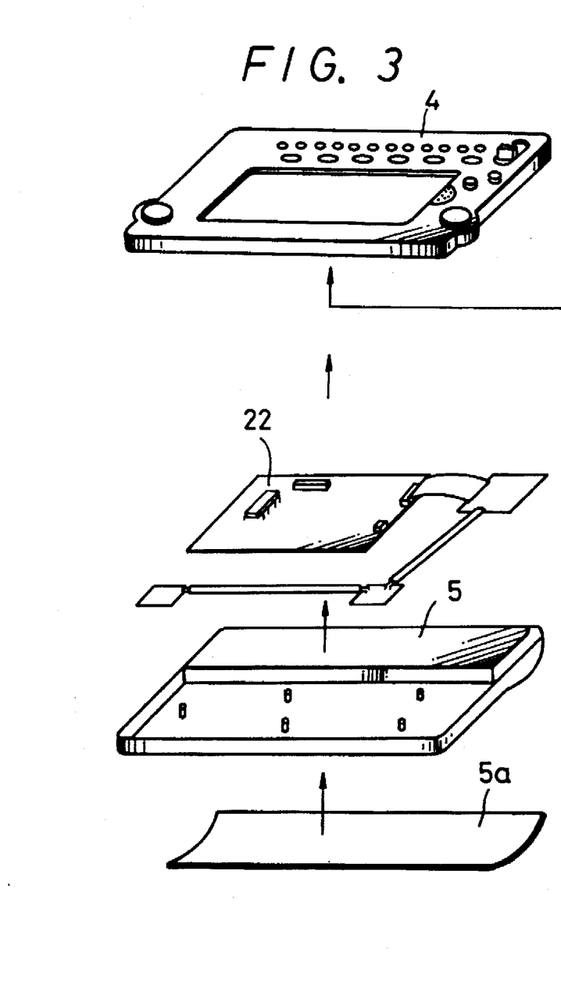
FIGS. 3 and 4 are exploded, perspective views illustrating the portable graphic computer of the embodiment of the present invention, respectively.
Figure 4:
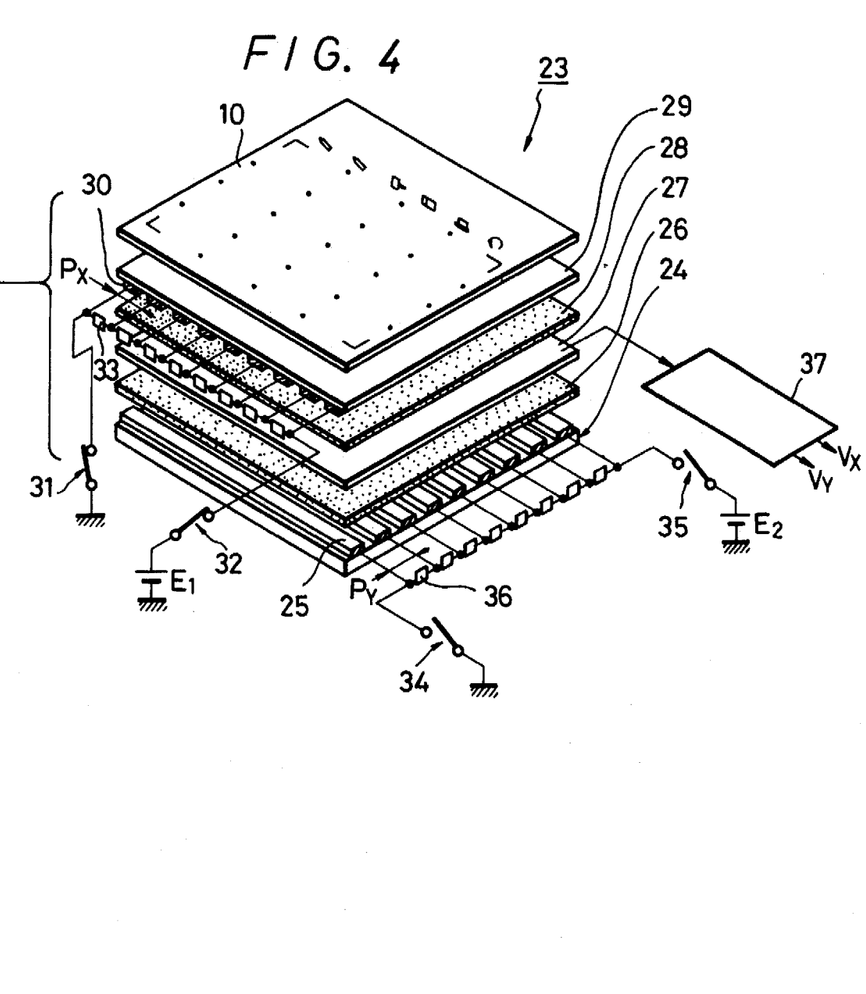

The inside structure of the graphic computer 1 of the example shown in FIG. 1 is represented in FIGS. 3 and 4 (illustrating the same in a more enlarged scale than FIG. 3). The upper and lower casings, 4 and 5 have sandwiched therebetween a pressure sensitive position sensing apparatus 23 including the tablet 10 and a printed circuit board 22. The lower casing 5 accommodates therein a battery cell or a rechargeable battery as a power source, and reference numeral 5a represents a battery cover. The graphic computer 1 of this embodiment may be driven by an AC power source adapter or the like.

The arrangement of the pressure sensitive position sensing apparatus 23 will be described with reference to FIG. 4. Referring to FIG. 4, thin strip electrodes 25 are formed on a first insulating substrate 24 at a pitch Py, and a first pressure sensitive conductive sheet 26 made of a pressure sensitive conductive rubber, a conductive plate 27, a second pressure sensitive conductive sheet 28 made of a pressure sensitive conductive rubber, and a second insulating substrate 29 having formed on a bottom surface thereof thin strip electrodes 30 at a pitch Px are sequentially laminated on the first insulating substrate 24. The tablet 10 is mounted on the second insulating substrate 29. These conductive plate 27, second insulating substrate 29 and the tablet 10 are respectively made flexible. P. assumes resolution in the X-direction of the input coordinates of this embodiment, and Py assumes resolution in the Y-direction thereof. A ratio, Px Py is determined to be the same as the pixel ratio of the minimum pixels of a picture screen of a standard monitor. The values of resolutions Px, Py are, for example, about 0.3 mm.

The thin strip electrode 30 at one end side in the lateral direction of the second insulating substrate 29 is grounded through a switch circuit 31, while the thin strip electrode 30 of the other end side is connected to a dc voltage source having a voltage E1 through a switch circuit 32. Those thin strip electrodes 30 are connected sequentially with resistors 33 having the same resistance value. Similarly, the thin strip electrode 25 at one end side in the longitudinal direction of the second insulating substrate 24 is grounded through a switch circuit 34, while the thin strip electrode 25 at the other end side is connected to a dc voltage source having a voltage E2 through a switch circuit 35. Those thin strip electrodes 25 are connected sequentially with resistors 36 having the same resistance value. When the user pushes the tablet 10 at a certain position, the pressure sensitive conductive sheets 26 and 28 at that position are conducted. Thus, when the pair of switch circuits 31 and 32 are closed, the conductive plate 27 derives a voltage corresponding to the coordinate of the X-direction, whereas when the pair of switch circuits 34 and 35 are closed, the conductive plate 27 derives a voltage corresponding to the coordinate of the Y-direction. Reference numeral 37 represents a coordinates detecting section. When the pair of switch circuits 31, 32 or the pair of switch circuits 34, 35 are alternately closed and the voltages generated at the conductive plate 27 are held, the coordinate detecting section 37 generates voltages (Vx, Vy) corresponding to the input coordinates (X, Y) of the tablet 10.

A further detailed arrangement of the pressure sensitive position sensing apparatus 23 shown in the example of FIG. 4 and a modified example thereof are described in Japanese Patent Laid-Open Gazette No. 58-90235. However, the coordinates detecting device of the present invention is not limited to the pressure sensitive type.

Figure 5:
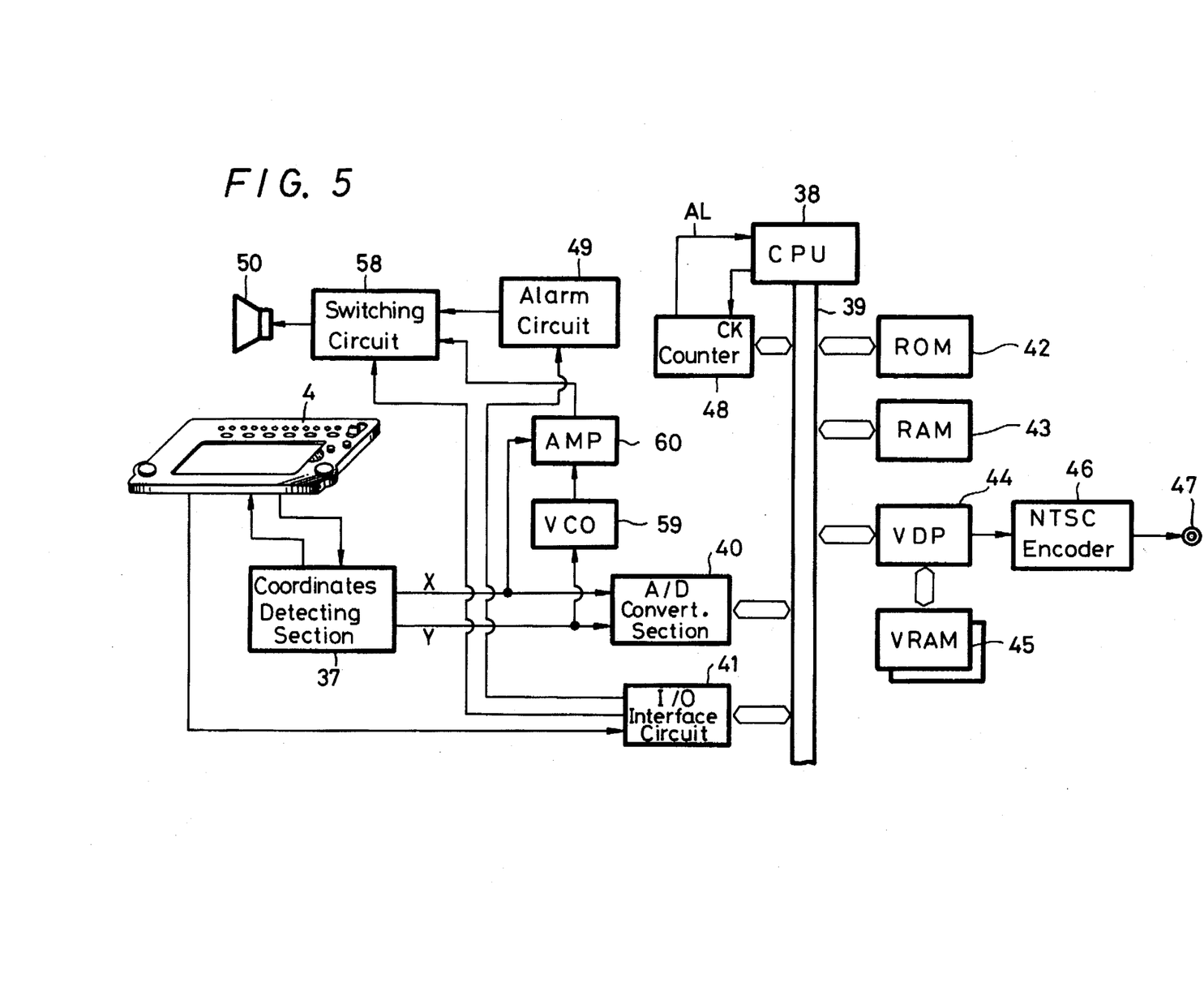
FIG. 5 is a block circuit diagram of the portable graphic computer of the present invention.

FIG. 5 shows a circuit arrangement of the graphic computer 1 of this embodiment. In FIG. 5, reference numeral 38 represents a central processing unit (hereinafter referred to as a CPU), 39 a system bus for the CPU 38 and which is comprised of a data bus, an address bus and a control bus, 42 represents a ROM for storing therein a program of the CPU 38 and video data in the demonstration-mode that will be described later, and 43 a RAM. These ROM 42 and RAM 43 are connected to the system bus 39. Reference numeral 40 represents an analog—to-digital (A/D) converting section, and the CPU 38 is supplied with the voltages (Vx, Vy) corresponding to the input coordinates (X, Y) from the coordinates detecting section 37 via the A/D converting section 40. If the voltages (Vx, VY) correspond to the coordinates (X, Y) in the picture-making area 10b of the tablet 10, the coordinates (X, Y) are written into the RAM 43. If the voltages (Vx, Vy) correspond to the coordinates (X, Y) in the menu selecting area 10c (see FIG. 2) of the tablet 10, the CPU 38 identifies the depressed button from the buttons 14, 15 to 20 on the basis of the coordinates (X, Y). Color data or tool data corresponding to the identified button is written into the RAM 43. When the tool buttons 15 to 20 are selected, the CPU 38 will perform the operations corresponding to those tools. Reference numeral 41 represents an input/output (I/O) interface circuit, and the CPU 38 always watches through the I/O interface circuit 41 whether the mechanical switches (the clear button 7, the sound button 57, and the executing buttons 8A, 8B in FIG. 1) are operated or not.

Reference numeral 44 represents a video processor (hereinafter, referred to as a VDP) connected to the system bus 39, 45 a video RAM (VRAM) having a capacity of 2 frames (2 pages), and 46 an NTSC encoder 46. The VDP 44 reads out data of the input coordinates (X, Y) and color data from the RAM 43 on the basis of commands from the CPU 38 and writes color video data into the VRAM 45 at its corresponding address. Also, it reads out color video data of 1 frame from the VRAM 45 periodically, and supplies the same to the NTSC encoder 46. The NTSC encoder 46 converts the color video data supplied thereto into a composite video signal CV and supplies the same to a video signal output terminal 47. In this embodiment, since the VRAM 45 has a storage capacity of 2 pages, in a certain procedure (one procedure means a process carried out during the period in which the executing button 8A or 8B is operated as mentioned above), the VDP 44 writes and reads video data in the region of, for example, the first page. In the next procedure, after moving the video data of the first page into the region of second page completely, the VDP 44 writes and reads video data in the region of the second page. If the CPU 38 issues a cancel command to the VDP 44 when the cancel button 20 of the tool selecting area 13 in the tablet 10 is pushed, the VDP 44 again reads the video data in the first page region of the VRAM 45, and writes the video data into the first page region when the CPU 38 is supplied with coordinates input. This means the picture in the picture screen 2a of the monitor 2 returns to a picture of one procedure before by operating the cancel button 20. There is then the advantage that, when the user draws a wrong picture in the picture drawing mode, the original picture can be recovered in a one-touch fashion.

In FIG. 5, reference numeral 48 represents a counter, 49 an alarm circuit, and 50 a speaker provided for the sound emanating section 9 (see FIG. 1). The counter 48 keeps counting the clock pulse from the CPU 38 and can clear the count value at any time by a clear pulse from the CPU 38. When the count value of the counter 48 reaches the value of 5 minutes, i.e. the clear pulse has not been supplied to the counter 48 from the CPU 38 for five minutes, the counter 48 supplies an alarm signal AL to the CPU 38. During the normal drawing mode, the CPU 38 supplies an alarm operation signal to the alarm circuit 49 through the I/O interface circuit 41 in response to the alarm signal AL. The alarm circuit 49 is comprised of a timer, an oscillator, a synthesizer, a power amplifier or the like, and supplies a signal corresponding to predetermined sound, melody or a message to the speaker 50 through a switching circuit 58 for only two minutes in response to the alarm operation command from the CPU 38. These counter 48, alarm circuit 49 and speaker 50 are mainly provided in order to generate an alarm sound by which the user can be protected from leaving the power switch in its ON state.

The voltage Vy generated at the coordinates detecting section 37 is supplied to the switching circuit 58 through a voltage controlled oscillator (VCO) 59 and a variable gain amplifier 60, whereas the voltage Vx generated at the coordinates detecting section 37 is supplied to a gain control terminal of the variable gain amplifier 60. The CPU 38 changes-over the switching circuit 58 through the I/O interface circuit 41.

When the sound button 57 is once depressed, the CPU 38 changes-over the switching circuit 58 to permit an output signal of the variable gain amplifier 60 to be fed to the speaker 50. When the sound button 57 is depressed one more time or when an alarming operation, which will be described later, is carried out, the CPU 38 supplies an output signal of the alarm circuit 58 to the speaker 50. Therefore, when the sound button 57 is depressed once and the coordinates (x, Y) on the tablet 10 is pushed, then the speaker 50 emanates a sound whose sound volume and musical scale (i.e., frequency) change in proportion to the coordinate values X and Y.

Alternatively, the musical scale may change in accordance with the coordinates value X and the sound volume may change in accordance with the coordinates value Y. Further, the musical scale or the like may change along a diagonal line of the picture-making area 10b.

When the graphic computer 1 of this embodiment is used, it is enough that, as shown in FIG. 1, the video signal output terminal of the graphic computer 1 is just coupled to the video signal input terminal of the monitor 2 via the video cable 3. When the user slides the power switch 6 to its ON-side, the picture screen 2a of the monitor 2 displays thereon for a predetermined period of time a demonstration display which teaches the user an example of how to use the graphic computer 1 of the embodiment. More specifically, a pen as a cursor is displayed on the picture screen 2a to draw a predetermined picture or an eraser as a cursor is displayed thereon to erase the picture, whereby the user can understand how to use the graphic computer.

A demonstration display program is written in the ROM 42 and includes color data, tool data and a series of data of the input coordinates (X, Y) or the like. The CPU 38 sequentially reads these data and moves the same to the RAM 43 and the VDP 44 produces video data corresponding to the data of the RAM 43, whereby the demonstration display is carried out as though the user draws a locus on the tablet 10 in actual practice. There is then the substantial advantage that the capacity that the demonstration display program shares in the ROM 42 can be relatively reduced.

If the user operates the clear button 7 or the sound button 57 or if the user operates the executing button 8A or 8B or if the user inputs coordinates to the tablet 10 (including the menu selecting area 10c) during the demonstration display mode, then the graphic computer 1 of this embodiment is set in "picture drawing model", whereby the picture displayed on the picture screen 2a of the monitor 2 is thoroughly erased and the graphic computer 1 is set in the standby mode awaiting the user's input. After the user designates the tool by pushing the color button 14, the bold line button 15 or the very bold line button 16 with the accessory pen 11 or the fingertip and the like, if the user freely draws a locus by slightly touching the picture making area 10b with the accessory pen 11 under the condition that the executing button 8A or 8B is depressed, a figure similar to the locus with designated color and thickness can be drawn on the picture screen 2a of the monitor 2 by the cursor 21. In this case, if the executing button 8A or 8B is not depressed, the cursor 21 will move in the background of the previously-drawn picture on the picture screen 2a. Thus, the locus of the cursor 21 is not displayed as a picture until the executing button 8A or 8B is operated. Accordingly, the position of the cursor can be determined precisely when the user moves from a certain step, for example, of the drawing to the next step.

If the graphic computer is set in the sound emanating mode by operating the sound button 57, when the user slightly touches the picture-making area 10b of the tablet 10 with the fingertip or the like, the speaker 50 successively emanates sound in response to the coordinates (X, Y). There is then the advantage that the user can enjoy the sound emanated. In this case, the sound volume and the musical scale change in proportion to the coordinates X and Y, whereby the user can play a melody or the like.

If the user depresses the brush button 17 in the menu selecting area 10c, the cursor 21 is shaped as a brush so that, when the user slightly touches the picture making area 10b with the accessory pen 11 or the like, the user can paint in a designated color the inside of a closed figure (circle, rectangle or the like) near the locus of the brush-shaped cursor within the previously-drawn picture.

Figure 6A:
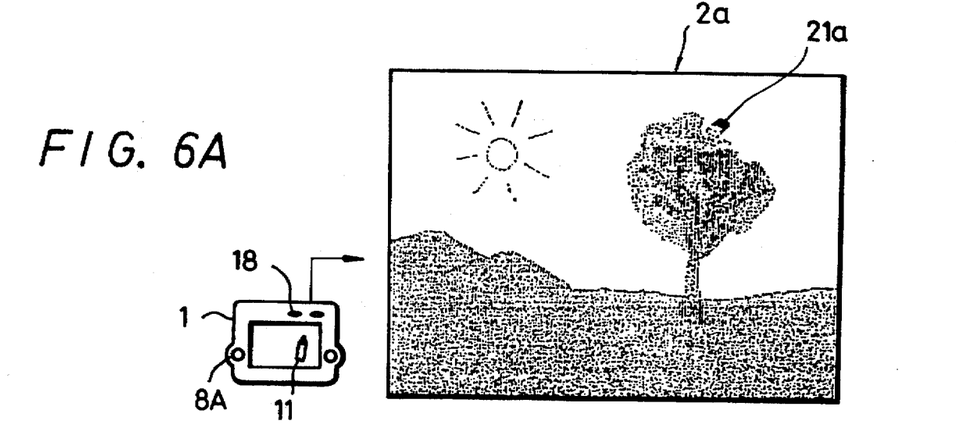
FIGS. 6 to 10 are schematic diagrams used to explain an operation of this embodiment, respectively.
Figure 6B:
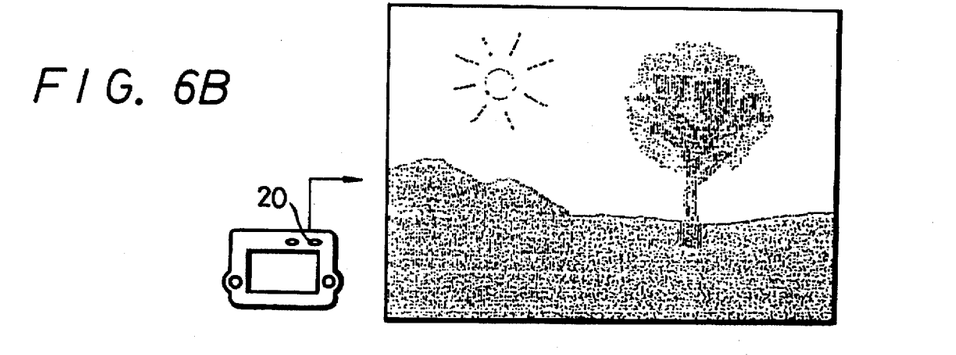

If the user depresses the eraser button 18 in the menu selecting area 10c and slightly touches the picture-making area 10b with the accessory pen 11 or the like, an eraser-shaped cursor 21a is displayed in the background of the previously drawn picture on the picture screen 2a of the monitor 2 as shown in FIG. 6A so that, when the user depresses the executing button 8A or 8B while moving the attachment pen 11 or the like, the previously-drawn picture can be erased partly. If the picture is erased too much, the picture screen 2a can be returned to the previous picture produced before, by depressing the cancel button 20 in the menu selecting area 10c as shown in FIG. 6B.

Figure 7:
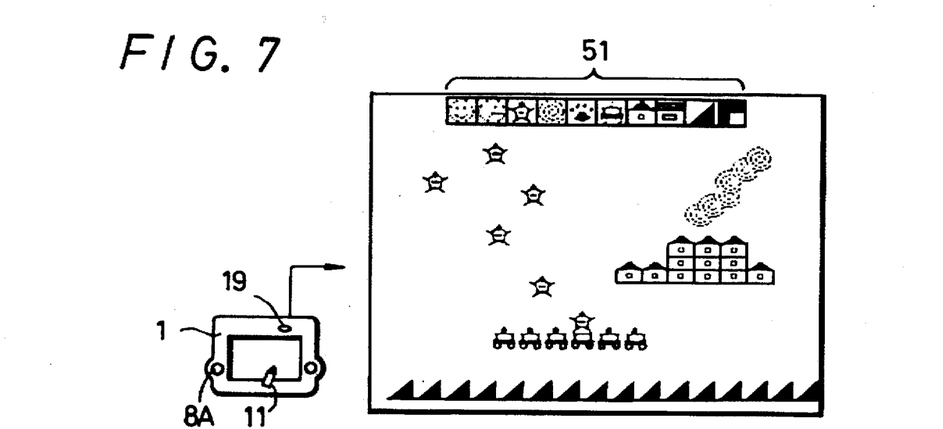

If the user depresses the stamp button 19 in the menu selecting area 10c, as shown in FIG. 7, several kinds of stamp characters 51 are displayed in the upper portion of the picture screen 2a of the monitor 2. For example, if the user pushes the tablet 10 at a portion corresponding to a desired character in the stamp characters 51, then that character is selected as a cursor. If the user depresses the executing button 8A or 8B while slightly touching the tablet 10 with the accessory pen 11 or the like, then a desired stamp character will be displayed on the picture screen at its portion designated by the depression of the executing button 8A or 8B. Further, the stamp character can be superimposed upon the previously-drawn picture.

As described above, in the graphic computer 1 of this embodiment, the pressure sensitive type position sensing apparatus 23 involving the tablet 10, the CPU 38, the VDP 44, the VRAM 45, and the NTSC encoder 46 or the like are formed as one body and the picture is formed with ease only by connecting the graphic computer 1 and the monitor 2 via the video cable 3. Therefore, the arrangement of this system can be simplified and children can use this graphic computer with ease. Thus, the system of this embodiment is suitable for the children to draw a picture.

Figure 8:
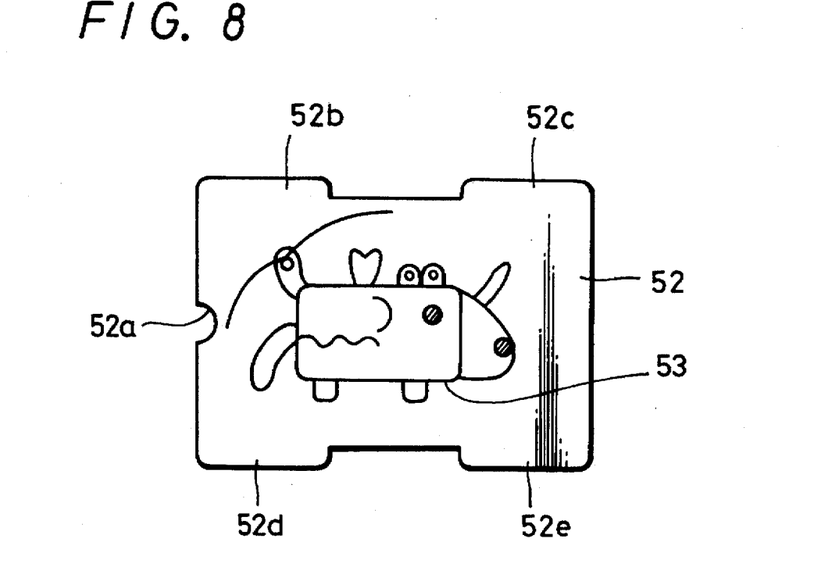

On picture-making area 10b of the tablet 10 of the graphic computer 1 in this embodiment, there can be loaded a play card 52 that is a flexible sheet in which a predetermined character 53 is printed on one or both surfaces thereof as shown in FIG. 8. This play card 52 is substantially rectangular, in which two protruding portions (inserting portions) 52b, 52c are formed on an upper side portion thereof while two protruding portions (inserting portions) 52d, 52e are formed on a lower side portion thereof and a semicircular notch 52a for ejecting the play card 52 is formed on a left side portion thereof, respectively.

Figure 9:
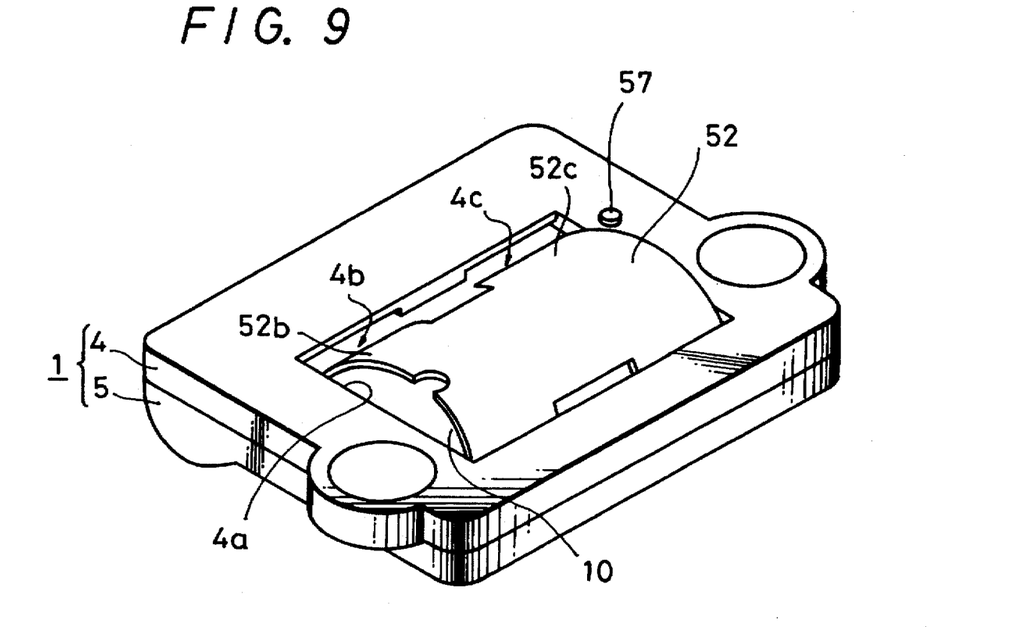
Figure 10:
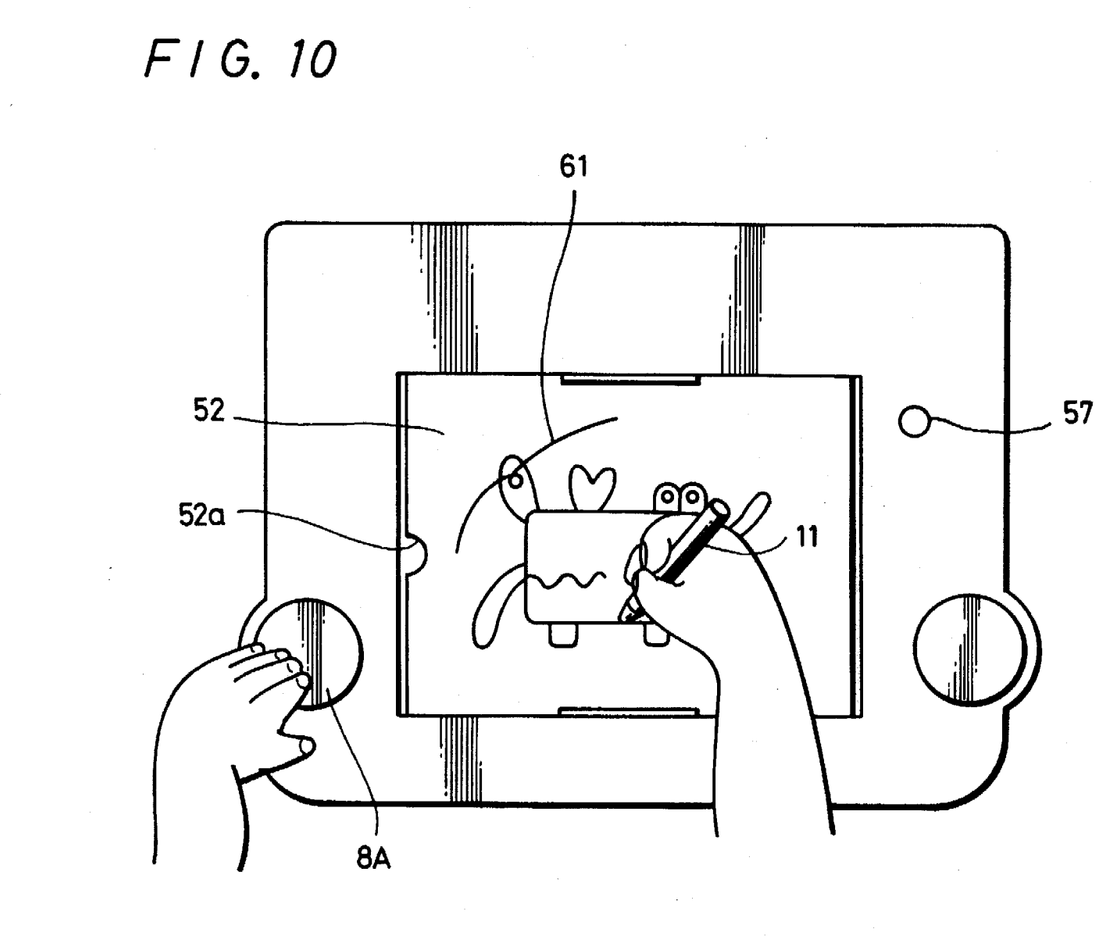

When the play card 52 is loaded on the graphic computer 1 of this embodiment, the inserting portions 52b and 52c of the upper side portion of the play card 52 are respectively inserted into the slots 4b and 4c adjacent to the tablet 10 on the upper casing 4 of the graphic computer 1 while the play card 52 is slightly deformed as shown in FIG. 9. Then, the inserting portions 52d and 52e of the lower side portion of the play card 52 are respectively inserted into the slots 4d and 4e of the upper casing 4 (see FIG. 1), whereby the play card 52 is stably loaded on the tablet 10 in flat as shown in FIG. 10.

As a method for using the play card 52, there might be considered "tracing", "sound play" and "puzzle game,, or the like. If the user selects the "tracing", the respective portions of the character 53 of the play card 52 shown in FIG. 8 are marked with, for example, numerals such as 1', 2', 3', . . . In some case, the user traces the respective portions of the character 53 in the order of 1', 3', 5', 8', . . . In other case, the user traces the respective portions of the character 53 in the order of 1', 2', 4', 7', . . . so that, for example, different animal characters are respectively displayed on the picture screen 2a of the monitor 2. In other words, a kind of a hidden picture search play becomes possible.

In the case of "sound play", a predetermined curve 61 (see FIG. 10) is printed, for example, on the play card 52 in advance. If the user traces the curve 61 with a fingertip or the like after setting the graphic computer in the sound emanating mode by operating the sound button 57, a predetermined melody or the like will be produced. Further, as the play card 52, such a variant may be considered, in which the surface thereof is partitioned at every musical scale to provide areas in which characters of "do, "re", "mi", etc., are provided.

In the case of "puzzle game", words having ciphers are printed on the play card 52 at some positions in advance and the user writes words while guessing the ciphers.

As described above, if the play card 52 of this embodiment is used, the system in the example of FIG. 1 can be applied not only to the picture drawing but also to a sophisticated play or to a kind of learning. In this case, since the play card 52 of this embodiment is provided with the inserting portions 52b to 52e while the slots 4b to 4e are formed on the portion in which the upper casing 4 of the graphic computer 1 contacts with the tablet 10, the play card 52 can be loaded on the graphic computer with ease. Moreover, since the play card 52 is provided with the notch 52a for gripping the play card, the play card 52 can be ejected from the graphic computer 1 with ease.

Instead of forming the grooves 4b to 4e on the upper casing 4, a leaf spring may be provided on the edge portion of the recess 4a of the upper casing 4 in order to fix the peripheral section of the play card 52. In that case, the inserting portions 52b to 52e can be removed from the play card 52.

Operations of the counter 48 and the alarm circuit 49 in this embodiment will be described. In the normal picture drawing mode, the counter 48 keeps counting the clock pulse from the CPU 38. Each time the coordinates data (involving the menu selecting area 10c) are inputted on the tablet 10 or the clear button 7 is depressed or the executing button 8A or 8B is depressed, the CPU 38 causes the counter 48 to clear the count value. When the demonstration display is carried out after the graphic computer is powered, the CPU 38 holds the condition of the counter 48 in which the count value of the counter 48 is cleared. In the normal picture drawing mode, if the user has neither touched the tablet 10 nor the user has depressed any mechanical switch for five minutes, such as when the power switch is not turned OFF inadvertently (including the case in which the user has not carried out any operation for five minutes after the completion of the demonstration display), then the count value of the counter 48 reaches the value equivalent to five minutes so that the counter 48 supplies the alarm signal AL to the CPU 38.

When receiving the alarm signal AL, since the CPU 38 changes-over the switching circuit 58 through the I/O interface circuit 41 to urge the alarm circuit 49 to perform the alarm operation, an alarm sound, such as a predetermined sound, melody, message etc., is emanated from the speaker 50 for two minutes. Thus, the user can be protected from leaving the power switch in its ON state, inadvertently. If the power switch 6 is not turned OFF during a time period of two minutes while the speaker 50 emanating sound, the CPU 38 holds the condition of the counter 48 in which the count value of the counter 48 is cleared.

The graphic computer 1 of this embodiment has programmed therein a demonstration mode (shop display mode) in addition to the above-described normal mode. The demonstration mode is utilized to display the system shown in FIG. 1 so that a customer can freely operate this system at the shop window of the shop. When the graphic computer is set in the demonstration mode, the user slides the power switch 6 to its ON-side while depressing the clear button 7. In the demonstration mode, the demonstration display begins after the graphic computer is powered. During the demonstration mode, if the user depresses the clear button 7, the executing button 8A or 8B or if the user inputs the coordinates data into the tablet 10, then the displayed picture is cleared and the graphic computer is set in the picture drawing mode, in which mode the user can draw a picture freely, similarly to the normal mode.

In this demonstration mode, the program is made so that if the user does not operate the graphic computer for five minutes until the demonstration display is ended after the power switch is turned ON, or if the user does not operate the graphic computer for 5 minutes during the picture drawing mode after the demonstration display is ended, the picture displayed on the picture screen 2a of the monitor 2 is cleared completely and the demonstration display is started once again. More specifically, the CPU 38, supplied with the alarm signal AL from the counter 48 when the demonstration mode is set, executes the demonstration display program once again without operating the alarm circuit 48. If the user operates the graphic computer during the demonstration display mode, the picture displayed on the picture screen is cleared and the graphic computer is set in the drawing mode. This means that, if the graphic computer is not operated at all for five minutes after the customer freely draws a picture when the system in the example of FIG. 1 is exhibited at a shop window, the picture drawn by the customer is automatically erased and the demonstration display is started once again. Therefore, according to this demonstration mode, when the graphic computer is exhibited at the shop front, the salesman need not clear the picture drawn by the customer, thus making the graphic computer easy to handle.

Figure 11:
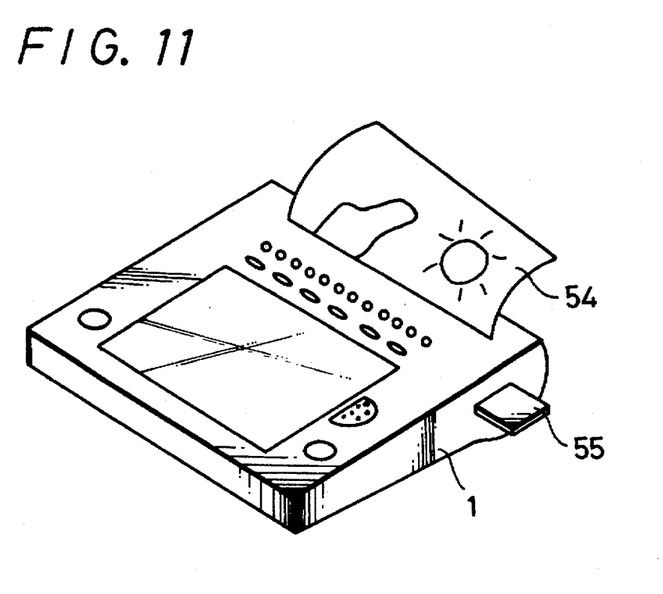
FIGS. 11 and 12 are perspective views illustrating other embodiments of the present invention, respectively.

The graphic computer 1 may incorporate therein a color or monochromatic printer (dot printer, printer-plotter, etc.) as shown in FIG. 11, so that the user can print a desired picture 54 at any time. In order to complement the ROM 42 in FIG. 5, an IC card in which an application software is written or a voice IC card as a pulse signal generator or an FM sound source, etc., may be provided as an attachable/ detachable card 55. Alternatively, the graphic computer may incorporate therein a disk driving apparatus for a 2-inch or 3.5-inch floppy disk.

Figure 12:
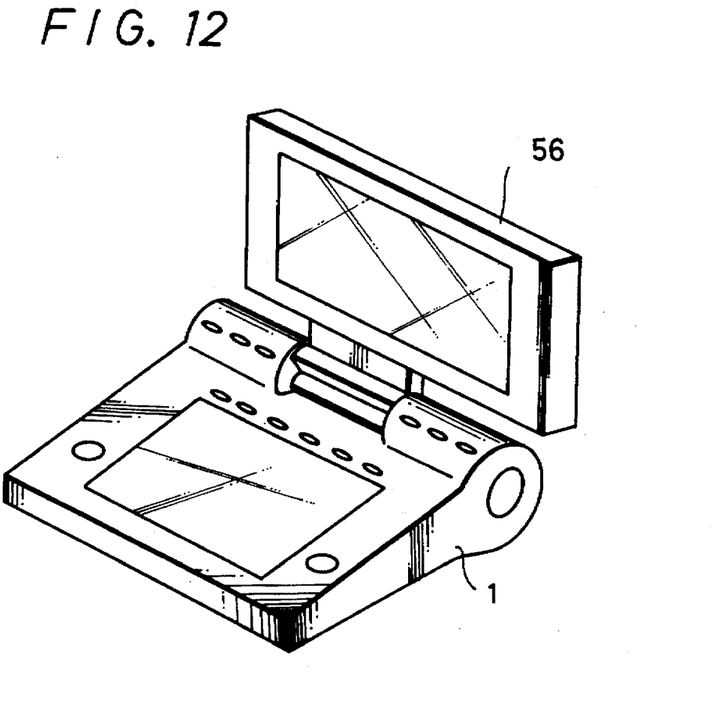

While in the above embodiment, the graphic computer 1 and the television monitor 2 are provided independently, as shown in FIG. 12, the television monitor 2 may be replaced with a liquid crystal display 56. This liquid crystal display 56 may be mounted on the cabinet of the graphic computer 1 so as to become freely rotatable. If the graphic computer 1 and the liquid crystal display 56 are unitarily formed in this way, the overall arrangement can be more simplified, and the graphic computer can be used conveniently because the coordinates input section and the image display section are located close to each other. Further, the liquid crystal display 56 may be replaced with an EL panel.

While in the above described embodiment, the composite video signal CV of the graphic computer 1 is supplied to the monitor 2 or the like, the composite video signal CV may be directly supplied to a video tape recorder or to an electronic camera, whereby the signal may be recorded in a video tape, a floppy disk or the like.

According to the present invention, constituent parts except for output means are accommodated in the cabinet and made unitary so that the overall arrangement of the apparatus can be miniaturized. Also, the apparatus can be used only by connecting the video signal forming means to the output means through, for example, the video cable so that children can operate this graphic computer with ease.

Further, since the graphic computer emanates a sound in which musical scale and sound volume thereof are changed in response to the input coordinates on the tablet, the user can enjoy not only drawing a picture but also listening to the emanated sound.

More specifically, if the sound volume and the musical scale are respectively changed in response to the change of input coordinates in one axial direction and in the other axial direction, there is then the advantage that the user can easily play a melody or the like with stress.

Having described preferred embodiments of the invention with reference to the accompanying drawings, it is to be understood that the invention is not limited to those precise embodiments and that various modifications and variations could be effected by one skilled in the art without departing from the spirit or scope of the novel concepts of the invention as defined in the appended claims.

We claim as our invention:

1. A portable graphic computer apparatus comprising:

(a) a tablet for inputting coordinate data;

(b) tracing means for performing a tracing motion on said tablet;

(c) detecting means for detecting coordinate data inputted by tracing motion of said tracing means on said tablet;

(d) video image data forming means connected to receive an output signal from said detecting means for forming video image data corresponding to input coordinates based on said coordinate data;

(e) a memory connected to said video image data forming means for storing said video image data;

(f) video signal generating means connected to said memory for generating a video signal from said video image data;

(g) a sound source;

(h) a speaker connected to said sound source;

(i) output means connected to said video signal generating means for outputting said video signal;

(j) a cabinet for enclosing at least said tablet and said detecting means, and said cabinet having an aperture aligned with a tracing area of said tablet for tracing said tracing area of said tablet, wherein a musical scale of said sound source is varied by a changing first output signal of said coordinate data detecting means, said changing first output signal being generated in response to movement of said tracing means in one direction relative to said tablet, and a sound volume of said sound source is varied by a changing second output signal of said coordinate data detecting means, said changing second output signal being generated in response to movement of said tracing means in a different direction from said one direction relative to said tablet; and (k) an executing switch for fixing video image data corresponding to movement of said tracing means.

2. A portable graphic computer apparatus according to claim 1, wherein the sound volume of said sound source is successively changed in accordance with a change of input coordinates on said tablet in one axial direction, while the musical scale of said sound source is successively changed in accordance with a change of said input coordinates in the other axial direction, whereby said sound volume increases from a low volume to a high volume as said input coordinates change from one end to the opposite end in said one axial direction and the pitch of said sound increases from a low pitch to a high pitch as said input coordinates change from one end to the opposite end in said other axial direction.

3. A portable graphic computer apparatus according to claim 1 or 2, further comprising a sound button for selectively controlling said coordinate detecting means so that said sound source is driven by an output signal of said coordinate detecting means.

4. A portable graphic computer apparatus according to claim 3, wherein said sound button is provided on said cabinet.

5. A portable graphic computer apparatus according to claim 1, wherein said cabinet has formed at peripheral portions thereof on said cabinet means for mounting a tracing sheet on said tablet.

* * * * *